(12) United States Patent
Ogura et al.

(10) Patent No.: US 8,419,202 B2
(45) Date of Patent: Apr. 16, 2013

(54) DISPLAY DEVICE AND BACKLIGHT DEVICE

(75) Inventors: Takeshi Ogura, Osaka (JP); Kazuyuki Ono, Osaka (JP); Takafumi Hara, Osaka (JP); Masateru Ueta, Chiyoda-ku (JP); Yuji Yamasaki, Chiyoda-ku (JP); Hideaki Kobiki, Chiyoda-ku (JP); Tomokazu Nagao, Chiyoda-ku (JP); Yuichi Watanabe, Chiyoda-ku (JP)

(73) Assignee: Sharp Kabushiki Kaisha, Osaka (JP)

( * ) Notice: Subject to any disclaimer, the term of this patent is extended or adjusted under 35 U.S.C. 154(b) by 4 days.

(21) Appl. No.: 13/144,091

(22) PCT Filed: Jan. 12, 2010

(86) PCT No.: PCT/JP2010/050235
§ 371 (c)(1),
(2), (4) Date: Aug. 11, 2011

(87) PCT Pub. No.: WO2010/082568
PCT Pub. Date: Jul. 22, 2010

(65) Prior Publication Data
US 2011/0286203 A1    Nov. 24, 2011

(30) Foreign Application Priority Data
Jan. 13, 2009  (JP) .................................. 2009-005166

(51) Int. Cl.
*G09F 13/04* (2006.01)
(52) U.S. Cl.
USPC ......................................... 362/97.1; 362/225
(58) Field of Classification Search ................. 362/97.2, 362/97.1, 225
See application file for complete search history.

(56) References Cited

U.S. PATENT DOCUMENTS

| 7,916,237 B2 * | 3/2011 | Jung et al. ........................ 349/58 |
| 8,075,150 B2 * | 12/2011 | Maruyama .................... 362/97.1 |
| 2006/0044780 A1 | 3/2006 | Kim |
| 2008/0297692 A1 | 12/2008 | Nagayoshi et al. |

FOREIGN PATENT DOCUMENTS

| JP | 2006-066360 A | 3/2006 |
| JP | 2007-128712 A | 5/2007 |
| JP | 2007-195309 A | 8/2007 |
| JP | 2008-299170 A | 12/2008 |

OTHER PUBLICATIONS

Official Communication issued in International Patent Application No. PCT/JP2010/050235, mailed on Apr. 13, 2010.

* cited by examiner

*Primary Examiner* — Mary Ellen Bowman
(74) *Attorney, Agent, or Firm* — Keating & Bennett, LLP

(57) ABSTRACT

The present invention relates to the rigidity of a backlight chassis and is applicable to a liquid crystal display device including a backlight chassis and a light source located in the backlight chassis. A liquid crystal display device according to the present invention includes a backlight chassis (24), located to face a rear surface of a liquid crystal panel (10), for supporting a light source (22) for illuminating the rear surface of the liquid crystal panel (10). The backlight chassis (24) is a substantively flat plate-like member with upright peripheral portions (24a through 24d), and includes grooves (71 through 74) in a first area (A1) and a second area (A2), which are separated from each other by a border line (L) set on the backlight chassis (24). According to the present invention, the entirety of the backlight chassis is unlikely to be deflected.

4 Claims, 8 Drawing Sheets

DISPLAY DEVICE AND BACKLIGHT DEVICE

TECHNICAL FIELD

The present invention relates to a display device, specifically to a structure of a backlight chassis, located to face a rear surface of a display section, for supporting a backlight. The present application claims the benefit of priority based upon Japanese Patent Application No. 2009-005166 filed on Jan. 13, 2009 under the Paris Convention or the laws and regulations of each of the nations in which the PCT National Phase of the present application is entered. The contents of the above-identified Japanese patent application is incorporated herein by reference.

BACKGROUND ART

A display device, for example, a liquid crystal display device (LCD) includes a backlight located on a rear side of a liquid crystal display section including a liquid crystal layer. In the liquid crystal display section, a voltage to be applied between two substrates holding the liquid crystal layer therebetween is controlled to put the liquid crystal layer into a mode of blocking light or into a mode of passing light. Thus, light of a desired color is displayed through color filters. Such a liquid crystal display device is disclosed in, for example, Japanese Patent Laid-Open Publication No. 2007-128712 (Patent Document 1). This publication describes a structure for attaching a light source to a backlight chassis. In such a liquid crystal display device, the backlight chassis is a flat plate-like member facing a rear surface of a liquid crystal panel and has such a size that can cover the entire surface of the liquid crystal panel.

CITATION LIST

Patent Document

Patent Document 1: Japanese Patent Laid-Open Publication No. 2007-128712

SUMMARY OF THE INVENTION

Technical Problem

Liquid crystal display devices are increasingly desired to be thinner and to have a larger screen for uses in TVs and the like. For decreasing the thickness of the liquid crystal display devices, it is now studied to decrease the thickness of the backlight chassis to a minimum possible level. Liquid crystal display devices are also desired to be produced at low cost. A thinner backlight chassis reduces the cost of the material thereof and also the production cost of the liquid crystal display device.

However, a 32-inch liquid crystal display device, for example, includes a display section of about 400 mm×about 700 mm, and a larger 65-inch liquid crystal display device includes a display section of about 800 mm×about 1400 mm. The backlight chassis has approximately the same size as that of the display section. In such a large-screen display device, a thinner backlight chassis is more likely to be deflected. A backlight chassis which is more likely to be deflected is more difficult to be handled during the production thereof or the like. The present invention proposes a backlight chassis usable for a thinner and larger-screen liquid crystal display device which is now desired.

Solution to the Problem

A display device according to the present invention includes a display section; a backlight chassis located to face a rear surface of the display section; and a light source, supported by the backlight chassis, for illuminating the rear surface of the display section. The backlight chassis is a substantively flat plate-like member with an upright peripheral portion and includes a groove in each of a first area and a second area which are separated from each other by a border line set on the backlight chassis. In this case, the first area and the second area separated from each other by the border line set on the backlight chassis each include a groove, and therefore the entirety of the backlight chassis is unlikely to be deflected.

The backlight chassis may be formed of a metal member, and the grooves may be formed by drawing processing. The backlight chassis may be a substantively rectangular member, and the border line may be set to extend between intermediate parts of two longer sides of the backlight chassis. In this case, the grooves may be formed to have line symmetry with respect to the border line. A plurality of grooves are provided in each of the first area and the second area. In this case, the grooves may include first grooves formed on both sides of the border line, and second grooves formed outer to the first grooves, and an intermediate portion of each of the second grooves may expand externally. The grooves may be partially bent or curved. The backlight chassis may be formed of a thin flat plate having a thickness of less than 0.8 mm, and the grooves may have a depth which is at least 0.5 times and at most 6 times the thickness of the backlight chassis.

DESCRIPTION OF EMBODIMENTS

Figure 1:
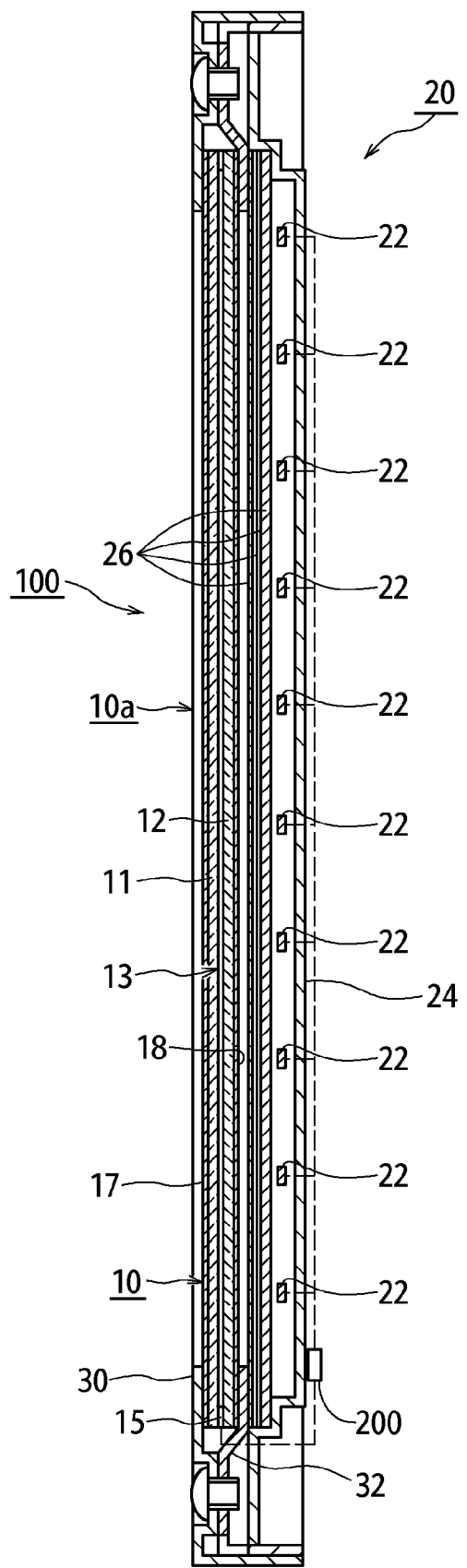
FIG. 1 is a cross-sectional view showing a liquid crystal display device.

Hereinafter, a liquid crystal display device as a display device according to one embodiment of the present invention will be described with reference to the drawings. The following embodiment merely presents one example of such a liquid crystal display device, and the specific structure of a liquid crystal display device according to the present invention is not limited to the following embodiment. In the figures, members or portions having the same functions bear the same reference characters when necessary. The present invention is not limited to being applied to a liquid crystal display device, and is applicable to any other display device which includes a backlight chassis.

FIG. 1 schematically shows a cross-sectional structure of a liquid crystal display device 100 according to one embodiment of the present invention. As shown in FIG. 1, the liquid crystal display device 100 includes a liquid crystal panel 10 as a liquid crystal display section (display section) and a backlight 20. The backlight 20 uses cold-cathode fluorescent tubes as light sources 22 and is supported by a backlight chassis 24. Here, a structure of the liquid crystal display device 100 will be first described briefly, and then a structure of the backlight chassis 24 will be described.

The liquid crystal panel 10 of the liquid crystal display device 100 has a substantively rectangular overall shape, and includes a pair of the light-transmissive substrates 11 and 12 (glass substrates). In this embodiment, among the two substrates 11 and 12, the substrate on a front side is a color filter substrate 11 (CF substrate), and the substrate on a rear side is an array substrate 12 (TFT substrate).

In this embodiment, as shown in FIG. 1, the color filter substrate 11 and the array substrate 12 have a pixel area 10a (an area in which pixels are formed). The color filter substrate 11 and the array substrate 12 are located to face each other. Between the color filter substrate 11 and the array substrate 12, a sealant 15 is provided so as to surround the perimeter (outer peripheral portion) of the pixel area 10a.

A liquid crystal layer 13 is provided between the color filter substrate 11 and the array substrate 12. In the liquid crystal layer 13, a liquid crystal material containing liquid crystal molecules is confined. The orientation of the liquid crystal molecules in such a liquid crystal material is controlled by an electric field applied between the color filter substrate 11 and the array substrate 12, and thus the optical characteristics of the liquid crystal material are changed. The sealant 15 confines such a liquid crystal material in the liquid crystal layer 13.

Figure 2:
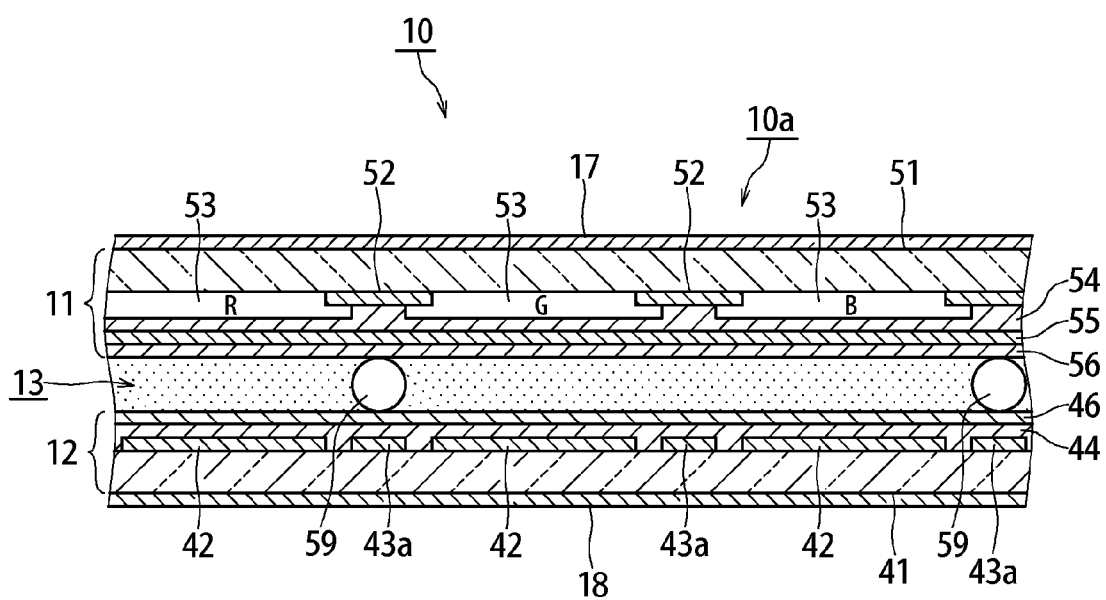
FIG. 2 is a cross-sectional view showing a liquid crystal panel of the liquid crystal display device.
Figure 3:
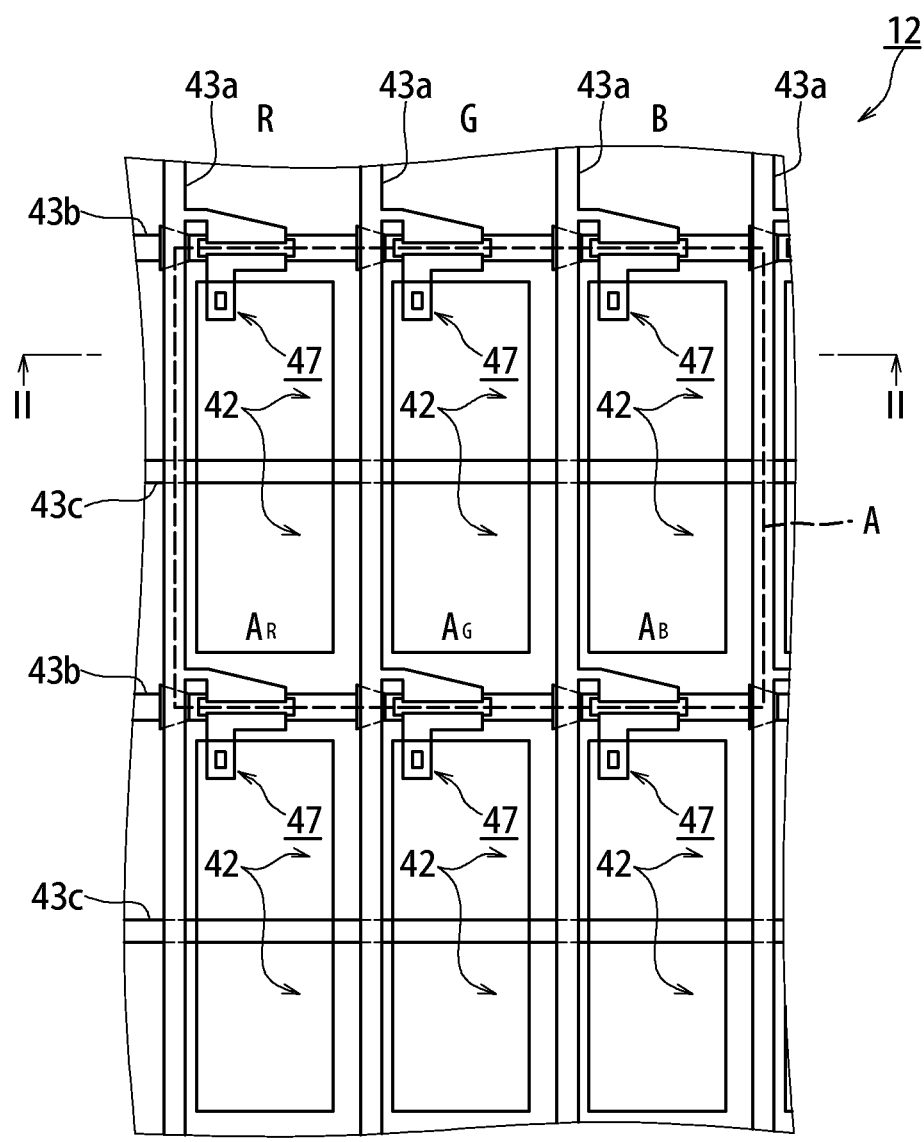
FIG. 3 is a plan view showing a part of an array substrate of the liquid crystal display device corresponding to a pixel area.
Figure 4:
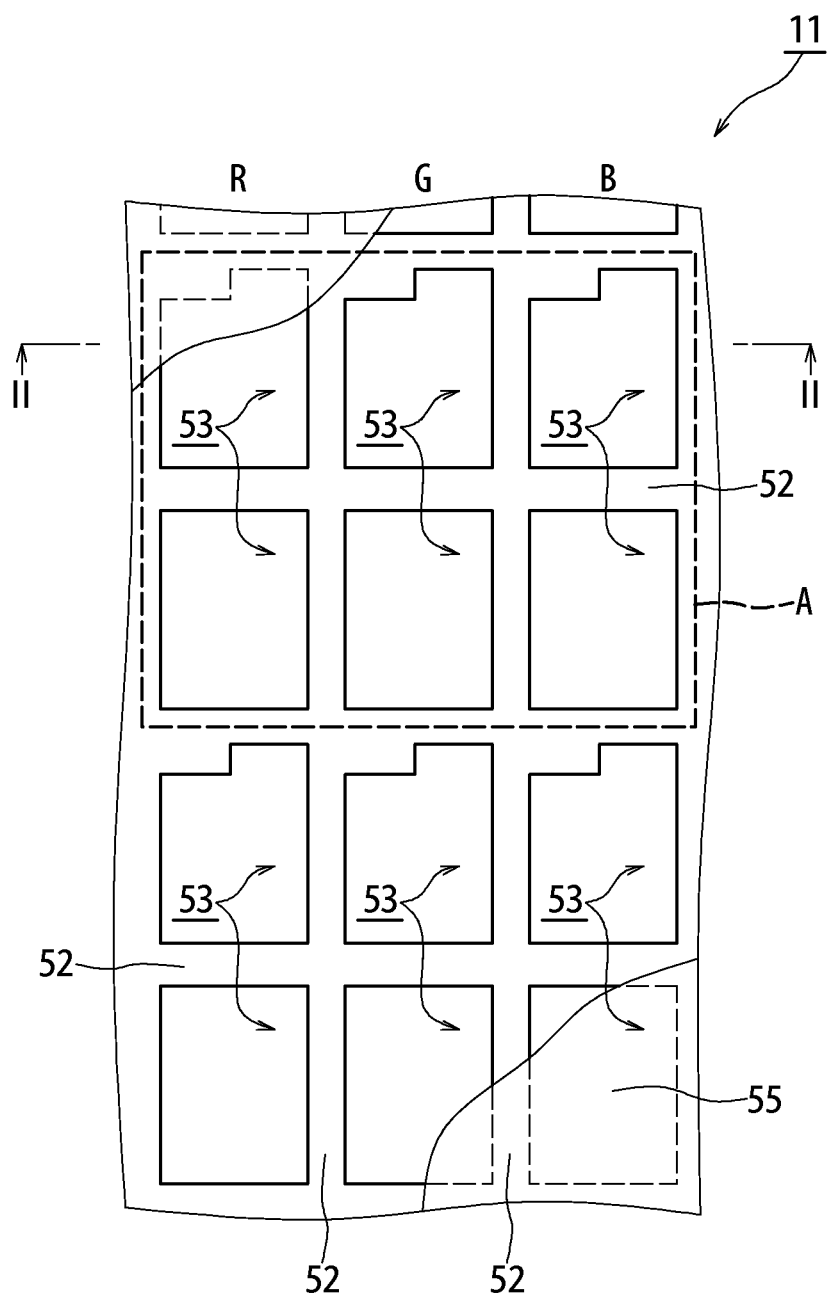
FIG. 4 is a plan view showing a part of a color filter substrate of the liquid crystal display device corresponding to the pixel area.

Hereinafter, the array substrate 12 and the color filter substrate 11 will be described sequentially. FIG. 2 through FIG. 4 are enlarged views of the pixel area 10a of the liquid crystal panel 10. FIG. 2 is a cross-sectional view of the color filter substrate 11 and the array substrate 12 which are put together. FIG. 3 is a plan view of a part of the array substrate 12 corresponding to the pixel area 10a, and FIG. 4 is a plan view of a part of the color filter substrate 11 corresponding to the pixel area 10a. In FIG. 3 and FIG. 4, the area enclosed by the dashed line A acts as one pixel of the liquid crystal display device 100.

In this embodiment, as shown in FIG. 2 and FIG. 3, the array substrate 12 includes a glass substrate 41; and pixel electrodes 42, bus lines 43a through 43c, a flattening layer 44, an alignment film 46 (horizontal alignment film), and thin film transistors 47 (TFTs), which are formed on the front side (on the liquid crystal layer 13 side) of the glass substrate 41. The pixel electrodes 42 are formed of ITO (indium tin oxide), which is a transparent conductive material. These pixel electrodes 42 are supplied with a voltage in accordance with an image at a prescribed timing via the bus lines 43a through 43c and the thin film transistors 47 (see FIG. 3). The flattening layer 44 is formed of an insulating material and covers the pixel electrodes 42 and the bus lines 43a through 43c (see FIG. 3). On the flattening layer 44, the alignment film 46 formed of polyimide or the like is provided. A surface of the alignment film 46 has been subjected to alignment treatment in order to determine the orientation of the liquid crystal molecules in the absence of the voltage.

As shown in FIG. 2 and FIG. 4, the color filter substrate 11 includes a glass substrate 51; and a black matrix 52, color filters 53, a flattening layer 54, a counter electrode 55, and an alignment film 56 (horizontal alignment film), which are formed on the rear side (on the liquid crystal layer 13 side) of the glass substrate 51. The black matrix 52 is formed of a metal such as Cr (chromium) or the like in order to prevent light from being transmitted through the inter-pixel area. The color filters 53 are of three colors of red (R), green (G) and blue (B). As shown in FIG. 2 through FIG. 4, either one of the R, G and B color filters 53 faces each pixel electrode 42 of the array substrate 12. As shown in FIG. 2, the flattening layer 54 covers the black matrix 52 and the color filters 53. Below the flattening layer 54, the counter electrode 55 formed of ITO (indium tin oxide) is provided. Below the counter electrode 55, the alignment film 56 is provided. A surface of the alignment film 56 also has been subjected to alignment treatment. The alignment direction of the alignment film 46 in the array substrate 12 and the alignment direction of the alignment film 56 in the color filter substrate 11 are different from each other by 90 degrees.

As shown in FIG. 2, the glass substrates 41 and 51 are located to hold spherical or cylindrical spacers 59 (in the example shown in the figure, spherical) therebetween. The spacers 59 are formed of, for example, a plastic material or glass. A gap between the glass substrates 41 and 51 is kept by the sealant 15 described above (see FIG. 1) and the spacers 59, and so the liquid crystal layer 13 is kept to have a constant thickness.

As shown in FIG. 1 and FIG. 2, polarizer plates 17 and 18 are attached respectively to the front side of the color filter substrate 11 (glass substrate 51) and the rear side of the array substrate 12 (glass substrate 41). In a so-called normally white liquid crystal display device, the two polarizer plates 17 and 18 are located such that polarization axes thereof cross each other perpendicularly. In a so-called normally black liquid crystal display device, the two polarizer plates 17 and 18 are located such that polarization axes thereof are parallel to each other. In this embodiment, as shown in FIG. 1, a bezel 30 is mounted on the front side of the liquid crystal panel 10. On the rear side of the liquid crystal panel 10, a frame 32 is mounted. The bezel 30 and the frame 32 support the liquid crystal panel 10. The frame 32 has an opening in an area corresponding to the pixel area 10a of the liquid crystal panel 10. On the rear side of the liquid crystal panel 10, the backlight 20 is mounted.

As shown in FIG. 1, the backlight 20 is an external light source located on the rear side of the liquid crystal panel 10 (in FIG. 1, the right side). In this embodiment, the backlight 20 includes a plurality of light sources 22 (cold-cathode fluorescent tubes) and the backlight chassis 24. The backlight chassis 24 includes a support section (not shown) for attaching the light sources 22 for illuminating a rear surface of the liquid crystal panel 10. To the backlight chassis 24, a control section 220 for controlling the light sources 22 are attached. In this embodiment, the cold-cathode fluorescent tubes are used as the light sources 22, and an inverter circuit board, for example, is used as the control section. In this embodiment, the backlight chassis 24 is a substantively flat plate-like member with upright peripheral portions, and is opened toward the front side (toward the liquid crystal panel 10). In the backlight chassis 24, the plurality of light sources 22 are located. In the opening of the backlight chassis 24, a plurality of optical sheets 26 are stacked.

The optical sheets 26 are, for example, a diffuser, a diffusion sheet, a lens sheet and a luminance increasing sheet which are located from the rear side sequentially in this order.

The backlight chassis 24 is mounted on the rear side of the frame 32 in the state where the light sources 22 are directed toward the liquid crystal panel 10. In this state, the optical sheets 26 are held between a rear surface of the frame 32 mounted on the liquid crystal panel 10 and a front surface of the backlight chassis 24. The control section 200 adjusts the brightness of the light sources 22 by, for example, adjusting the power input to the light sources 22. Although not shown, an external cover (decorative board) is mounted outer to the backlight chassis 24.

In the liquid crystal panel 10 of the liquid crystal display device 100, the liquid crystal molecules in the liquid crystal layer 13 are controlled by applying a controlled voltage to the color filter substrate 11 and the array substrate 12. Moreover, in such a liquid crystal panel 10, the liquid crystal molecules in the liquid crystal layer 13 are controlled for each pixel (more precisely, for each sub pixel, which is defined by RGB colors) to block or pass the light from the backlight 20, which changes the transmittance of the light. The liquid crystal display device 100 displays a desired image while controlling the luminance or the like of the backlight 20.

Hereinafter, a structure of the backlight chassis 24 of the liquid crystal display device 100 will be described.

Figure 5:
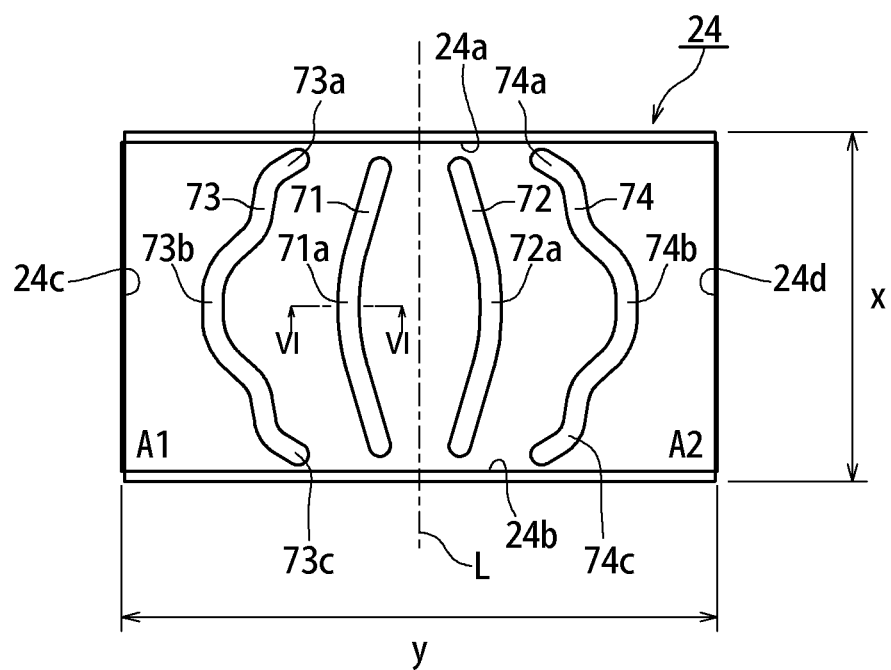
FIG. 5 is a plan view of a backlight chassis.

FIG. 5 is a plan view of the backlight chassis 24 in this embodiment. In this embodiment, the liquid crystal panel 10 (see FIG. 1) has a size of about 400 mm×about 700 mm when used in a 32-inch liquid crystal display device. As shown in FIG. 5, the backlight chassis 24 has approximately the same size as that of the liquid crystal panel 10, and has a size of about 400 mm (length direction: x)×about 700 mm (width direction: y). Such a size of the liquid crystal panel 10 and the backlight chassis 24 is merely an example, and the size of the liquid crystal panel 10 and the backlight chassis 24 is not limited to this.

In this embodiment, as shown in FIG. 5, the backlight chassis 24 is a substantively flat plate-like member with upright peripheral portions 24a through 24d. The backlight chassis 24 is formed of a thin steel plate, and the peripheral portions 24a through 24d are raised by press molding from the flat plate-like portion. The backlight chassis 24 includes a first area A1 and a second area A2 separated from each other by a border line L set on the backlight chassis 24, and includes grooves 71 through 74 in the first area A1 and the second area A2. The border line L is set at the time of design and is not actually drawn on the backlight chassis 24.

As shown in FIG. 5, the border line L of the backlight chassis 24 is set to extend between intermediate parts of longer sides thereof. The grooves 71 through 74 are formed to have line symmetry with respect to the border line L. In this embodiment, as shown in FIG. 5, a plurality of grooves (in the example shown in FIG. 5, two grooves) are provided in each of the first area A1 and the second area A2 (grooves 71 through 74). More specifically, in this embodiment, the grooves 71 through 74 are formed of the first grooves 71 and 72 which are formed on both sides of the border line L, and the second grooves 73 and 74 which are formed outer to the first grooves 71 and 72. The first grooves 71 and 72 have line symmetry with respect to the border line L, and the second grooves 73 and 74 have line symmetry with respect to the border line L.

The first grooves 71 and 72 are curved such that intermediate portions 71a and 72a expand externally. The second grooves 73 and 74 are located outer to the first grooves 71 and 72, and intermediate portions 73b and 74b thereof are curved to expand further externally. More specifically, in this embodiment, top portions 73a and 74a, the intermediate portions 73b and 74b, and bottom portions 73c and 74c of the second grooves 73 and 74 are set to have different curvatures so as to form paths having smooth steps. The distance between the intermediate portions 73b and 74b is larger than each of the distance between the top portions 73a and 74a and the distance between the bottom portions 73c and 74c.

Figure 6:
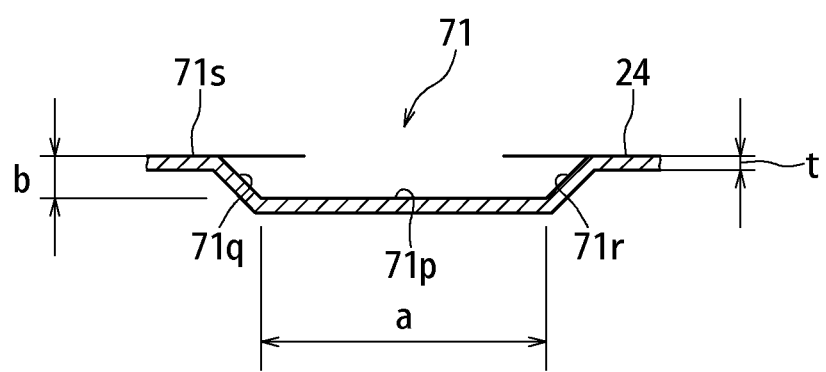
FIG. 6 is a cross-sectional view showing a shape of a groove formed in the backlight chassis.

FIG. 6 is a cross-sectional view of the groove 71, among the grooves 71 through 74, and the vicinity thereof. The other grooves 72 through 74 are molded to have substantively the same cross-section. The grooves 71 through 74 are formed to have a depth which is at least 0.5 times and at most 6 times the thickness of the backlight chassis 24. In this embodiment, the grooves 71 through 74 are molded to have substantially the same width and depth as one another. As shown in FIG. 6, the grooves 71 through 74 are each formed by deep drawing processing to have a width "a" of 20 mm and a depth b of 3.0 mm in the backlight chassis 24 having a thickness t of 0.6 mm. The grooves 71 through 74 formed by deep drawing processing each have a cross-section which has sides inclined from a bottom 71p toward the opening such that the opening is wider than the bottom 71p. In this embodiment, inclining faces 71q and 71r incline from the bottom 71p toward the opening at approximately 45 degrees with respect to a flat plate-like portion 71s of the backlight chassis 24.

The cross-sectional shape of the grooves 71 through 74 is not limited to the shape shown in FIG. 6. The cross-sectional shape of the grooves 71 through 74 may be determined in consideration of, for example, the properties or the like of the steel plate used for the backlight chassis 24. The degree of deep drawing processing used for forming the grooves 71 through 74 or the depth of the grooves with respect to the thickness of the steel plate may be set such that the steel plate is not disrupted. On one surface of the backlight chassis 24 (on a surface facing the liquid crystal panel), light sources (for example, cold-cathode fluorescent tubes) are located. Namely, on the surface of the backlight chassis 24, an attachment section for attaching the light sources is provided. On the other surface of the backlight chassis 24, a control board or the like is provided. The grooves 71 through 74 are recessed when seen from the side on which the light sources are provided, and are projected into the other side. In this embodiment, on the flat plate-like portion of the backlight chassis 24 in which the grooves 71 through 74 are not formed, the control board or other components are provided, for example.

As shown in FIG. 5, the backlight chassis 24 is a substantively flat plate-like member with the upright peripheral portions 24a through 24d, and includes grooves 71 through 74 in the first area A1 and the second area A2 separated from each other by the border line L set on the backlight chassis 24. Therefore, when a force acts to deflect the backlight chassis 24, mainly the peripheral portions 24a through 24d and an area having the grooves 71 through 74 stiffen against the force of deflecting the backlight chassis 24 because of the characteristics provided by the shapes of the peripheral portions 24a through 24d and the grooves 71 through 74. Owing to this, the backlight chassis 24 is unlikely to be deflected as compared with the case where the grooves 71 through 74 are not formed. In this embodiment, the backlight chassis 24 is formed of a steel plate which is as thin as 0.6 mm, but a required level of rigidity is provided by the above-described structure including the peripheral portions 24a through 24d and the grooves 71 through 74.

In this embodiment, the backlight chassis 24 is a metal member (in this embodiment, a steel plate), and the grooves 71 through 74 may be formed by drawing processing. The backlight chassis 24 is a substantively rectangular member. In this case, the border line L is set to extend between the intermediate parts of the longer sides of the backlight chassis 24. The backlight chassis 24 includes the grooves 71 through 74 in the first area A1 and the second area A2 separated from each other by the border line L, and thus a substantively uniform level of rigidity can be guaranteed for the entirety of the backlight chassis 24. In this embodiment, the grooves 71 through 74 are formed to have line symmetry with respect to the border line L. Therefore, a more uniform level of rigidity can be guaranteed for the entirety of the backlight chassis 24.

In this embodiment, a plurality of grooves are formed in each of the first area A1 and the second area A2 (grooves 71 through 74). Since the first area A1 and the second area A2 each have a plurality of grooves (grooves 71 through 74), the grooves can be dispersed in each of the first area A1 and the second area A2. In this embodiment, the grooves 71 through 74 include the first grooves 71 and 72 formed on both sides of the border line L, and the second grooves 73 and 74 formed outer to the first grooves 71 and 72. The intermediate portions 73b and 74b of the second grooves 73 and 74 expand externally. With such a structure, deflection of approximately the central portion of the backlight chassis 24 can be prevented by the first grooves 71 and 72 located in an inner area of the backlight chassis 24. Even when the backlight chassis 24 is subjected to a deformational force of twisting the backlight chassis 24, a required force of preventing such a deformation can be generated because the intermediate portions 73b and 74b of the second grooves 73 and 74 located outer to the first grooves 71 and 72 expand externally.

As described above, it is preferable that the grooves 71 through 74 are partially bent or curved. In this case, as compared with the case where the grooves 71 through 74 are linear, the backlight chassis 24 can be prevented from bending along the grooves 71 through 74. In this embodiment, as shown in FIG. 6, the backlight chassis 24 is formed of a flat plate. The thickness t of the backlight chassis 24 is 0.6 mm. The grooves 71 through 74 are molded to have a depth b of 3.0 mm by deep drawing processing. In this case, the depth b of the grooves 71 through 74 is five times the thickness t of the backlight chassis 24. In the case where the backlight chassis 24 has a thickness t of 0.8 mm or less, it is preferable that the grooves 71 through 74 have a depth b which is at least 0.5 times and at most 6 times the thickness t of the backlight chassis 24. Owing to this, the effect of improving the rigidity provided by the grooves 71 through 74 becomes conspicuous. The depth b of the grooves 71 through 74 may be, for example, at least 1.0 or 1.5 times the thickness t of the backlight chassis 24. The depth of the grooves 71 through 74 may be appropriately set such that a required level of rigidity of the backlight chassis 24 is obtained.

So far, an example of the backlight chassis 24 according to the present invention has been described. The shape of the backlight chassis 24 according to the present invention is not limited to the above shape. For example, in the above embodiment, two grooves are formed in each of the first area A1 and the second area A2, but the number of the grooves in each of the first area A1 and the second area A2 is not limited to two, and may be three or four. The number of the grooves may be appropriately set in accordance with the size of the backlight chassis 24.

Figure 7:
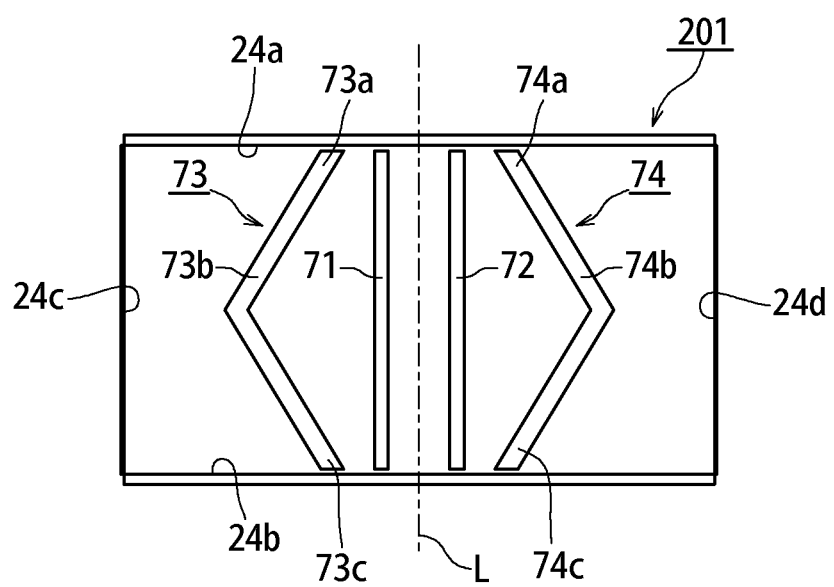
FIG. 7 is a plan view of a backlight chassis according to another embodiment.
Figure 8:
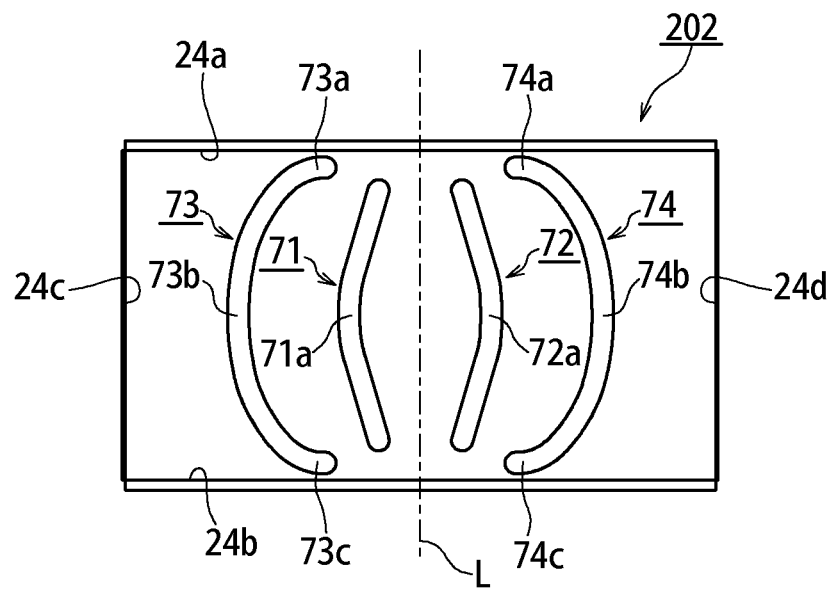
FIG. 8 is a plan view of a backlight chassis according to still another embodiment.
Figure 9:
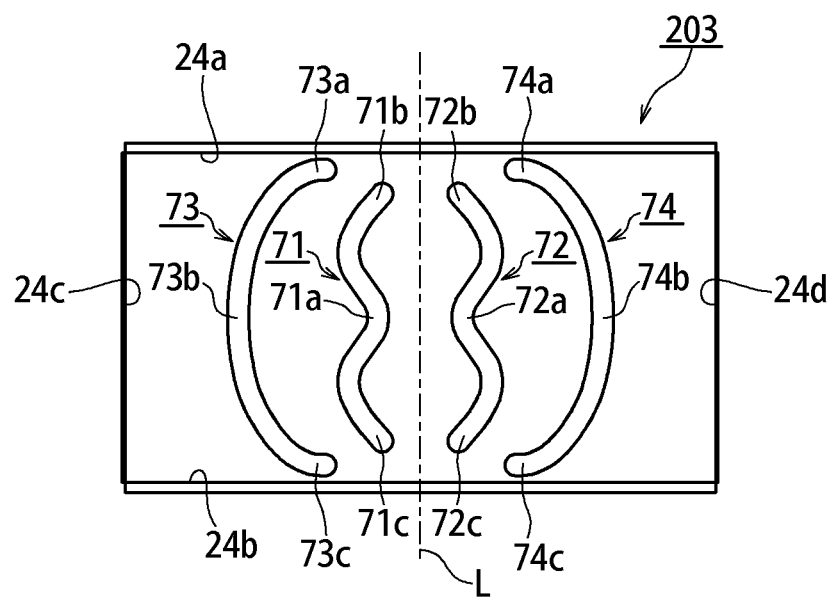
FIG. 9 is a plan view of a backlight chassis according to still another embodiment.

The shape of the grooves 71 through 74 formed by deep drawing processing may be altered variously. FIG. 7 through FIG. 9 respectively show backlight chassis 201, 202 and 203 with altered shapes of the grooves 71 through 74.

For example, in the backlight chassis 201 shown in FIG. 7, the first grooves 71 and 72 provided in an inner area of the backlight chassis 24 are linear. The second grooves 73 and 74 are not smoothly curved, but the intermediate portions 73b and 74b are bent externally. Owing to this, the distance between the intermediate portions 73b and 74b of the second grooves 73 and 74 are larger than each of the distance between the top portions 73a and 74a and the distance between the bottom portions 73c and 74c. The backlight chassis 201 includes the upright peripheral portions 24a through 24d, and the flat plate-like portion of the backlight chassis 201 also includes the grooves 71 through 74. Therefore, when a force acts to deflect the backlight chassis 201, the peripheral portions 24a through 24d and the grooves 71 through 74 stiffen against the force of deflecting the backlight chassis 201 because of the characteristics provided by the shapes of the peripheral portions 24a through 24d and the grooves 71 through 74. Owing to this, the backlight chassis 201 is unlikely to be deflected as compared with the case where the grooves 71 through 74 are not formed. The shape of the grooves 71 through 74 may be altered variously as described above.

The backlight chassis 202 shown in FIG. 8 is different from the backlight chassis 24 shown in FIG. 5 in the shape of the second grooves 73 and 74. In the backlight chassis 202 shown in FIG. 8, the second grooves 73 and 74 are uniformly smoothly curved substantively, and the intermediate portions 73b and 74b are curved externally. In this case also, the peripheral portions 24a through 24d and the grooves 71 through 74 stiffen against the force of deflecting the backlight chassis 202 because of the characteristics provided by the shapes of the peripheral portions 24a through 24d and the grooves 71 through 74. Owing to this, the backlight chassis 202 is unlikely to be deflected as compared with the case where the grooves 71 through 74 are not formed.

The backlight chassis 203 shown in FIG. 9 is different from the backlight chassis 202 shown in FIG. 8 in the shape of the first grooves 71 and 72. In the backlight chassis 202 shown in FIG. 8, the first grooves 71 and 72 are uniformly smoothly curved substantively, and intermediate portions 71a and 72a are curved externally. By contrast, in the backlight chassis 203 shown in FIG. 9, the intermediate portions 71a and 72a, top portions 71b and 72b and the bottom portions 71c and 72c of the first grooves 71 and 72 are pulled internally, and the portions therebetween expand externally, with uniformly smoothly curved lines. In this case also, the peripheral portions 24a through 24d and the grooves 71 through 74 stiffen against the force of deflecting the backlight chassis 203 because of the characteristics provided by the shapes of the peripheral portions 24a through 24d and the grooves 71 through 74. Owing to this, the backlight chassis 203 is unlikely to be deflected as compared with the case where the grooves 71 through 74 are not formed.

As described above, the backlight chassis may have the shape shown in each of FIG. 7 through FIG. 9. These shapes are formed to have line symmetry with respect to the border line L, and therefore a substantively uniform level of rigidity can be guaranteed for the entirety of the backlight chassis. As described above, the grooves 71 through 74 may be partially bent or curved. As shown in FIG. 5, FIG. 8 and FIG. 9, in the case where the planar shape of the grooves 71 through 74 is represented by a mild and smooth curve, generation of wrinkles in deep drawing processing can be alleviated and thus distortion of the backlight chassis can be alleviated.

The present inventors made a test on how much the rigidity is improved when the grooves 71 through 74 having the shape shown in each of FIG. 5 and FIG. 7 through FIG. 9 are formed. The backlight chassis was formed of a zinc-plated steel plate having a thickness of 0.6 mm and a size of 400 mm×700 mm. The peripheral portions 24a through 24d were raised, and the grooves 71 through 74 of the shape shown in each of FIG. 5 and FIG. 7 through FIG. 9 were formed. As shown in FIG. 6, the grooves 71 through 74 were formed by deep drawing processing so as to have a width "a" of 20 mm and a depth b of 3.0 mm. The grooves 71 through 74 were formed to have inclining faces 71$q$ and 71$r$ inclining from a bottom 71$p$ toward the opening at approximately 45 degrees with respect to the flat plate-like portion 71$s$ of the backlight chassis 24.

The present inventors examined the torsional rigidity and the tensile rigidity of the backlight chassis shown in each of FIG. 5 and FIG. 7 through FIG. 9. The backlight chassis had the same size and were formed of the same steel material. The above-mentioned backlight chassis were compared and evaluated with a backlight chassis having a thickness of 0.8 mm and the upright peripheral portions 24$a$ through 24$d$ but having none of the grooves 71 through 74 (hereinafter, referred to as "comparative example A") and with a backlight chassis having a thickness of 0.6 mm and the upright peripheral portions 24$a$ through 24$d$ but having none of the grooves 71 through 74 (hereinafter, referred to as "comparative example B").

Figure 10:
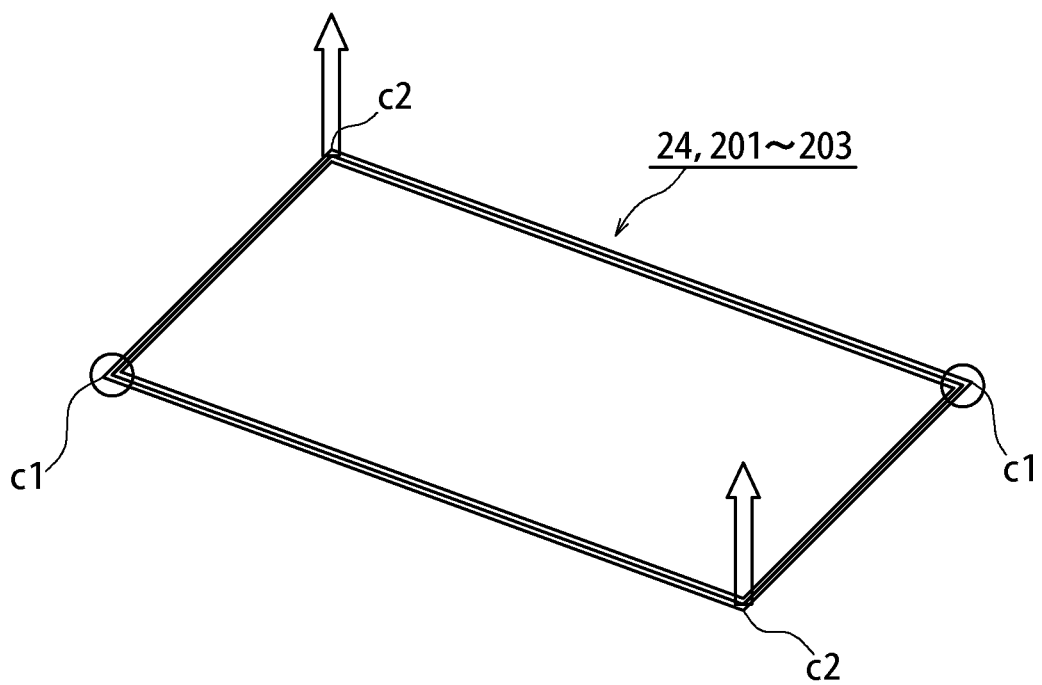
FIG. 10 is a view showing an outline of a test for examining the torsional rigidity.
Figure 11:
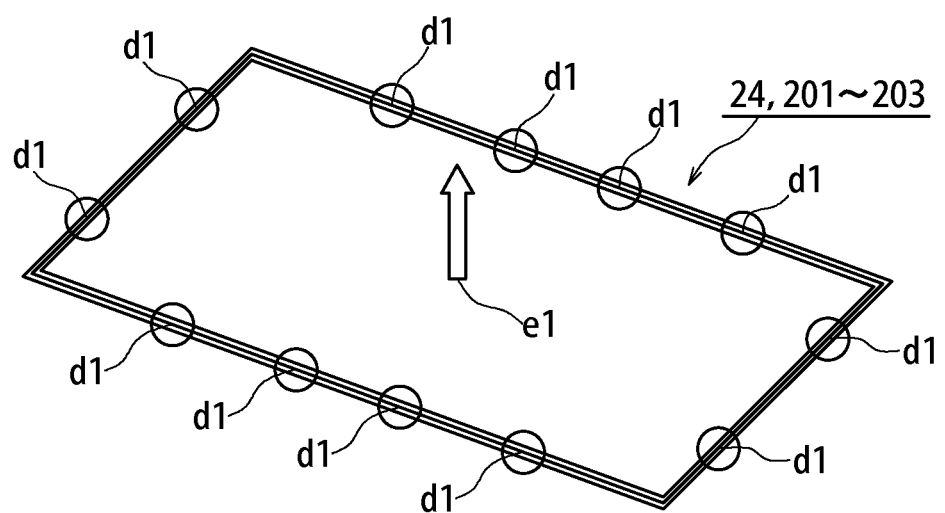
FIG. 11 is a view showing an outline of a test for examining the tensile rigidity.

In a test for examining the torsional rigidity, as shown in FIG. 10, a pair of diagonally opposite corners c1 of each of the backlight chassis 24 and 201 through 203 were fixed, whereas the other pair of diagonally opposite corners c2 were pulled up with a load. The torsional rigidity was evaluated with the load at which the pair of diagonally opposite corners c2 supplied with the load were displaced by 20 mm. For examining the tensile rigidity, as shown in FIG. 11, peripheral points d1 of each of the backlight chassis 24 and 201 through 203 were fixed, whereas a central portion e1 of the flat plate-like portion was pulled up with a load. The tensile rigidity was evaluated with the load at which the central portion e1 supplied with the load were displaced by 2 mm.

The torsional rigidity of each of the backlight chassis in FIG. 5 and FIG. 7 through FIG. 9 was lower than that of the backlight chassis of comparative example A with a thickness of 0.8 mm by merely 10% to 20%. By contrast, the torsional rigidity of the backlight chassis of comparative example B having a thickness of 0.6 mm but having none of the grooves 71 through 74 was lower than that of the backlight chassis of comparative example A with a thickness of 0.8 mm by 20% or greater. This shows that the reduction in the torsional rigidity can be alleviated by providing the grooves 71 through 74 as described above.

The tensile rigidity of each of the backlight chassis in FIG. 5 and FIG. 7 through FIG. 9 was lower than that of the backlight chassis of comparative example A with a thickness of 0.8 mm by merely less than 10%. By contrast, the tensile rigidity of the backlight chassis of comparative example B having a thickness of 0.6 mm but having none of the grooves 71 through 74 was lower than that of the backlight chassis of comparative example A with a thickness of 0.8 mm by 10% or greater. This shows that the reduction in the tensile rigidity can be alleviated by providing the grooves 71 through 74 as described above.

So far, the structure of the backlight chassis of the liquid crystal display device according to one embodiment of the present invention has been described. The liquid crystal display device according to the present invention is not limited to the above-described embodiment.

For example, the present invention is applicable to backlight chassis of various sizes, for example, a backlight chassis of a 65-inch (about 800 mm×1400 mm) display device in addition to a 32-inch (about 400 mm×700 mm) display device. In the above example, the border line is set to extend between the intermediate parts of the longer sides of the backlight chassis, but the border line is not limited to being set at such a position. It is not absolutely necessary to set the border line to extend between precisely the central positions of the longer sides measured from both ends of the longer sides. The border line may extend between positions shifted from precisely the central positions. In the above embodiment, in the backlight chassis which is longer in the width or transverse direction, the border line is set to extend in the length direction, between the longer or transverse sides of the backlight chassis. Instead, in the backlight chassis which is longer in the width or transverse direction, the border line may be set to extend in the transverse direction, between intermediate parts of shorter sides of the backlight chassis. As a material used for the backlight chassis, a thin steel plate is mentioned above, but the present invention is not limited to this. Materials contributing to decreasing the thickness of, and thus usable for, the backlight chassis include a wide variety of metal materials (e.g., zinc-plate steel plate, stainless steel plate, aluminum steel plate). The backlight chassis may also be formed of a non-metal material (resin plate material). The thickness of the backlight chassis is not limited to 0.6 mm, which is used above.

The display section of the device according to the present invention may be any display section as long as a backlight device is provided on the rear surface of the display section and display is provided by transmitting the light directed to irradiate the rear surface. Therefore, the display section is not limited to a liquid crystal panel. As described above, the present invention relates to the rigidity of the backlight chassis, and is applicable to various backlight devices including a light source located in a backlight chassis. Preferably, the backlight chassis is a substantively flat plate-like member with upright peripheral portions and includes a groove in each of a first area and a second area which are separated from each other by a border line set on the backlight chassis.

DESCRIPTION OF REFERENCE CHARACTERS

10 Liquid crystal panel (liquid crystal display section)
10$a$ Pixel area
11 Color filter substrate (CF substrate, light-transmissive substrate)
12 Array substrate (TFT substrate, light-transmissive substrate)
13 Liquid crystal layer
15 Sealant
17, 18 Polarizer plate
20 Backlight
22 Light source
24 Backlight chassis
24$a$-24$d$ Peripheral portion
26 Optical sheet
30 Bezel
32 Frame
41 Glass substrate (glass substrate of the array substrate)
42 Pixel electrode
43$a$-43$c$ Bus line
44 Flattening layer
46 Alignment film
47 Thin film transistor
51 Glass substrate (glass substrate of the color filter substrate)
52 Black matrix
53 Color filter
54 Flattening layer
55 Counter electrode
56 Alignment film
59 Spacer 71-74 Groove
100 Liquid crystal display device
200 Control section
201 Backlight chassis
202 Backlight chassis
203 Backlight chassis
A1 First area
A2 Second area

The invention claimed is:

1. A display device, comprising:
a display section;
a backlight chassis located to face a rear surface of the display section; and
a light source, supported by the backlight chassis, for illuminating the rear surface of the display section; wherein
the backlight chassis is a substantially flat plate-shaped member with an upright peripheral portion and includes a plurality of grooves in each of a first area and a second area which are separated from each other by a border line set on the backlight chassis,
the backlight chassis is defined by a metal member, and the plurality of grooves are formed by drawing processing;
the backlight chassis is a substantially rectangular member, and the border line is set to extend between intermediate portions of two longer sides of the backlight chassis;
the plurality of grooves are arranged to have line symmetry with respect to the border line;
the plurality of grooves include first grooves and second grooves, the first grooves are arranged on both sides of the border line and the second grooves are arranged outward from the first grooves; and
an intermediate portion of each of the second grooves is bent or curved toward the upright peripheral portion of the backlight chassis.

2. The display device of claim 1, wherein all of the plurality of grooves are partially bent or curved toward the upright peripheral portion of the backlight chassis.

3. The display device of claim 1, wherein the backlight chassis is defined by a thin flat plate having a thickness of less than about 0.8 mm, and the plurality of grooves have a depth which is at least about 0.5 times and at most about 6 times the thickness of the backlight chassis.

4. A backlight device including a backlight chassis and a light source located in the backlight chassis, wherein the backlight chassis is a substantially flat plate-shaped member with an upright peripheral portion and includes a plurality of grooves in each of a first area and a second area which are separated from each other by a border line set on the backlight chassis; wherein
the backlight chassis is defined by a metal member, and the plurality of grooves are formed by drawing processing;
the backlight chassis is a substantially rectangular member, and the border line is set to extend between intermediate portions of two longer sides of the backlight chassis;
the plurality of grooves are arranged to have line symmetry with respect to the border line;
the plurality of grooves include first grooves and second grooves, the first grooves are arranged on both sides of the border line and the second grooves are arranged outward from the first grooves; and
an intermediate portion of each of the second grooves is bent or curved toward the upright peripheral portion of the backlight chassis.

\* \* \* \* \*